United States Patent
Burns et al.

(10) Patent No.: US 9,021,677 B1
(45) Date of Patent: May 5, 2015

(54) APPARATUS AND METHOD FOR IMPROVING SAFETY AND QUALITY OF AUTOMATIC RIVETING OPERATIONS

(75) Inventors: Thomas E. Burns, Sanborn, NY (US); Kurt R. Kubanek, Grand Island, NY (US); Thomas H. Rummell, Buffalo, NY (US); Michael M. Beam, Buffalo, NY (US)

(73) Assignee: Gemcor II, LLC, West Seneca, NY (US)

( * ) Notice: Subject to any disclaimer, the term of this patent is extended or adjusted under 35 U.S.C. 154(b) by 97 days.

(21) Appl. No.: 13/348,739

(22) Filed: Jan. 12, 2012

(51) Int. Cl.
  *B21J 15/04* (2006.01)
  *B23Q 17/00* (2006.01)
(52) U.S. Cl.
  CPC .................................. *B23Q 17/005* (2013.01)
(58) Field of Classification Search
  CPC ....... B21J 16/32; B21J 15/10; Y10T 29/5377; Y10T 29/49956
  USPC ........... 29/243.53, 251, 281.4, 407.09, 407.1, 29/525.06, 559, 715, 798; 100/226, 100/269.06, 269.08, 269.2, 258 R; 227/152, 227/153, 110, 99, 6; 318/568.2; 408/13
  See application file for complete search history.

(56) References Cited

U.S. PATENT DOCUMENTS

| | | | | |
|---|---|---|---|---|
| 4,219,091 | A * | 8/1980 | Kleinhans | 177/211 |
| 4,314,481 | A * | 2/1982 | Wolfer et al. | 73/774 |
| 5,329,691 | A * | 7/1994 | Roberts et al. | 29/705 |
| 5,615,474 | A * | 4/1997 | Kellner et al. | 29/703 |
| 6,219,898 | B1 | 4/2001 | Kubanek et al. | |
| 6,295,710 | B1 | 10/2001 | Roberts et al. | |
| 6,427,312 | B1 | 8/2002 | Kubanek et al. | |
| 6,520,023 | B2 * | 2/2003 | Kimura | 73/795 |
| 7,694,577 | B2 * | 4/2010 | Engeler et al. | 73/774 |
| 2006/0186878 | A1 * | 8/2006 | Proksch et al. | 324/207.18 |

* cited by examiner

*Primary Examiner* — David Bryant
*Assistant Examiner* — Lee A Holly
(74) *Attorney, Agent, or Firm* — Hodgson Russ LLP

(57) ABSTRACT

An automatic riveting apparatus is improved by providing at least one sensor on a pressure foot plate or at an interface between the pressure foot plate and a pressure foot bushing of the apparatus for generating a signal indicative of force transmitted between the pressure foot plate and the pressure foot bushing. For example, the at least one sensor may include a strain gauge or other type of sensor for measuring deflection of the pressure foot plate, or it may include load cell(s) for measuring force at the interface between the pressure foot plate and the pressure foot bushing. A control system of the apparatus may be configured to execute one or more control functions based on a value of the sensor signal or signals. The control functions may adjust machine operation commands or trigger a safety mode based at least in part on the sensor signal.

9 Claims, 15 Drawing Sheets

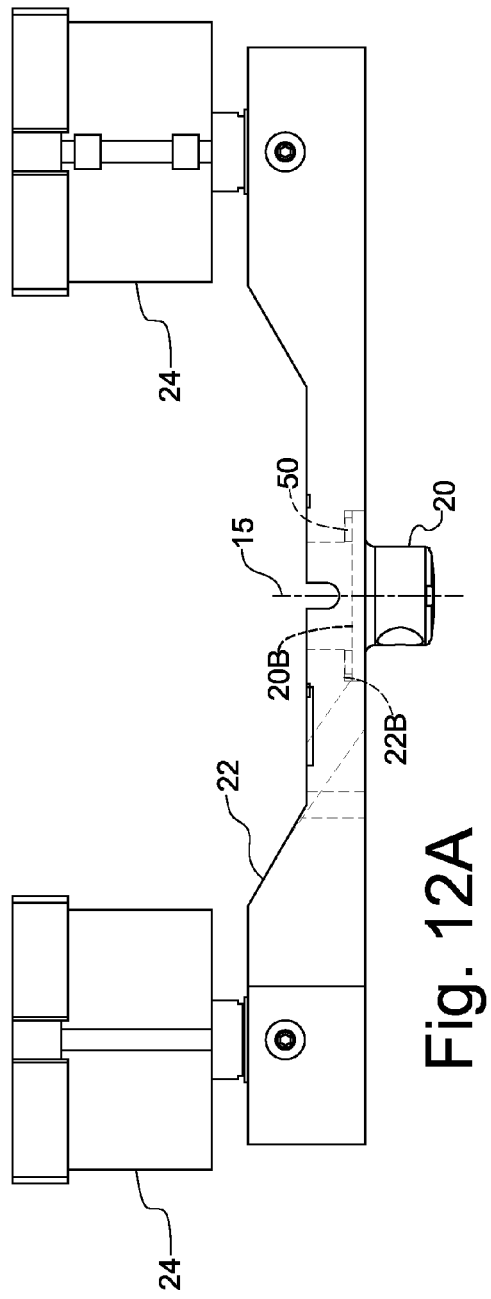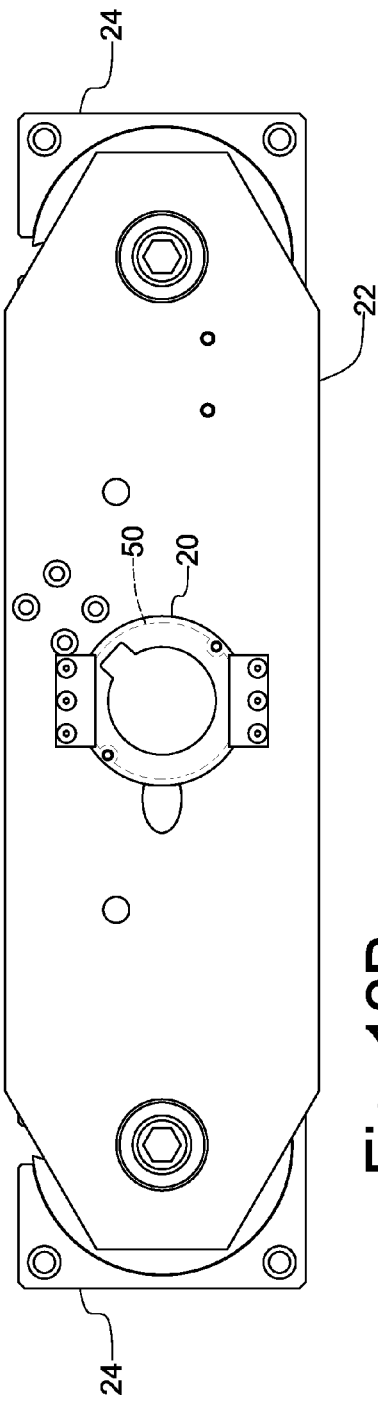
Fig. 12A
Fig. 12B

APPARATUS AND METHOD FOR IMPROVING SAFETY AND QUALITY OF AUTOMATIC RIVETING OPERATIONS

FIELD OF THE INVENTION

The present invention relates to the field of automatic riveting machines and automatic riveting methods.

BACKGROUND OF THE INVENTION

Automatic riveting machines are used in connection with fabricating the components of aircraft, for example the wing and fuselage portions of the aircraft. The machines are capable performing tooling operations on a workpiece, for example a panel or stack of panels. The operations typically include drilling and countersinking holes, positioning rivet slugs in the drilled holes, upsetting the rivet slugs to form an enlarged head at one end or a pair of enlarged heads at opposite ends of the slug, and shaving each rivet head such that it is substantially flush with the surface of the workpiece.

In order to perform the various operations necessary to install a rivet, an automatic riveting machine may comprise a head assembly locatable relative to the workpiece at respective rivet installation positions. In one configuration, the head assembly is mounted on a C-frame and includes an upper head and a lower head, and the workpiece is clamped between the upper and lower heads. More specifically, the upper head may include a pressure foot bushing having a clamping end for engaging a surface of a workpiece, a supported end opposite the clamping end, and a passage sized and arranged such that a tool is movable along a tool axis through the pressure foot bushing. The pressure foot bushing may be urged into clamping engagement against a surface of the workpiece by a pressure foot plate coupled to the supported end of the pressure foot bushing and acted upon by one or more actuators.

In another configuration of an automatic riveting machine, the head assembly is an "end effecter" mounted at the end of robot arm. The end effecter comprises a pressure foot bushing and an associated pressure foot plate, whereby a clamping end of the pressure foot bushing may be brought into pressing engagement with a surface of a workpiece.

When the pressure foot bushing is exerting a known force against stacked panels or against a panel on a fixture, any differences in the force required to press the panels together or against the fixture at given fastener locations will change the force imparted on the pressure foot bushing.

In an alternative arrangement, the clamping end of the pressure foot bushing is braced by a fixed pressure foot plate to oppose a predetermined clamping force exerted against an opposite side of the workpiece in a direction toward the clamping end of the pressure foot bushing. If the force required to clamp workpiece panels together or to push a workpiece panel to contact the pressure foot bushing is not the same at each fastener location, the actual force imparted on the pressure foot bushing will vary from fastener location to fastener location.

During operation, automatic riveting machines may experience errors that affect quality, safety, or both quality and safety. One type of error is a workpiece positioning error. The riveting machine is typically set up to run certain fasteners using small test panels ("coupons") duplicating the thickness and material, but not the total size, of the production panels. The difference in weight and how the test coupon is held compared to the fixtured production panel may introduce positioning errors when running the production panels. Sensors may also be used to control the robotic or CNC positioner of the riveting machine to set panel position in regard to the bottom surface of the pressure foot bushing. The sensors have a certain amount of offset from the actual tooling point of the bushing. If the panel is highly contoured or oddly shaped, the offset of the sensors can change the panel position. The position of the pressure foot bushing side of the panel is very important for the fastening process. For example, sometimes a countersink is drilled in the pressure foot side of the panel. The depth of the countersink will vary if panel position differs from one fastener location to the next. As another example, if there is error in the panel position, the anvil will not be in the correct position to contact the fastener which can create panel distortion during the fastening process. The anvil will also not seat an interference fit fastener properly if the panel is not in the correct position. Sometimes a fastener has its head on the pressure foot side shaved flush; again, any change in panel position will affect the shaved height of the fastener. Positioning errors of the kinds mentioned above often result in poor quality in the end product, and can lead to scrapping of expensive panels. In extreme cases, operator injury may result.

Another type of error is insufficient clamping force. This can lead to dangerous conditions. For example, when running set up operations on coupons, an unclamped or under-clamped coupon can spin during the drilling operation and potentially injure personnel.

It is also known to have errors in the automatic fastening process related to other factors. For example, a foreign object may become lodged between the pressure foot bushing and the panel surface. As another example, the drill bit used for drilling operations or the cutter used for shaving operations may become dull or break, and this will have a negative impact on quality.

Heretofore, manual measurement and operator observation have been used to check for errors during fastening program execution. Manual measurement slows down execution, and the operator observation is not always reliable. Often, program execution is halted after it is too late to save the panel or prevent injury. Thus, there is a need for an improved apparatus and method capable of automatically detecting unintended machining conditions at an early stage.

SUMMARY OF THE INVENTION

An automatic riveting apparatus is improved by providing at least one sensor on a pressure foot plate of the apparatus or at an interface between the pressure foot plate and a pressure foot bushing carried by the pressure foot plate for generating a signal indicative of force transmitted between the pressure foot plate and the pressure foot bushing. For example, in accordance with various embodiments, the at least one sensor may include a strain gauge or other type of sensor for measuring deflection of the pressure foot plate, or it may include one or more load cells for measuring force at the interface between the pressure foot plate and the pressure foot bushing. A control system of the apparatus may be configured to command (i.e. call and/or execute) one or more control functions based on a value of the sensor signal or signals. For some control functions, the value of each sensor signal generated during a production job may be compared to a corresponding reference value obtained while running test coupons to determine variations from ideal or expected loading conditions. The one or more control functions includes at least one of the following control functions: (i) controlling motion of the tool, (ii) controlling the clamping force, (iii) controlling a position of the workpiece, (iv) controlling an angular orientation of the workpiece relative to the pressure foot bushing, and (v) triggering a safety mode.

For example, the motion of a tool, such as a countersink or shave tool, may be controlled by applying a distance offset to a predetermined motion command (e.g. distance of travel along the tool axis) to fine tune the motion command based on actual production clamping conditions versus test coupon clamping conditions. As another example, the clamping force or workpiece position may be adjusted until the sensor signal agrees with an ideal or reference value. Other functions trigger a safety mode wherein machine operation is interrupted based on sensor signal changes.

The invention improves efficiency, quality, and safety.

BRIEF DESCRIPTION OF THE DRAWING VIEWS

The invention is described in detail below with reference to the following figures.

Figure 10A:
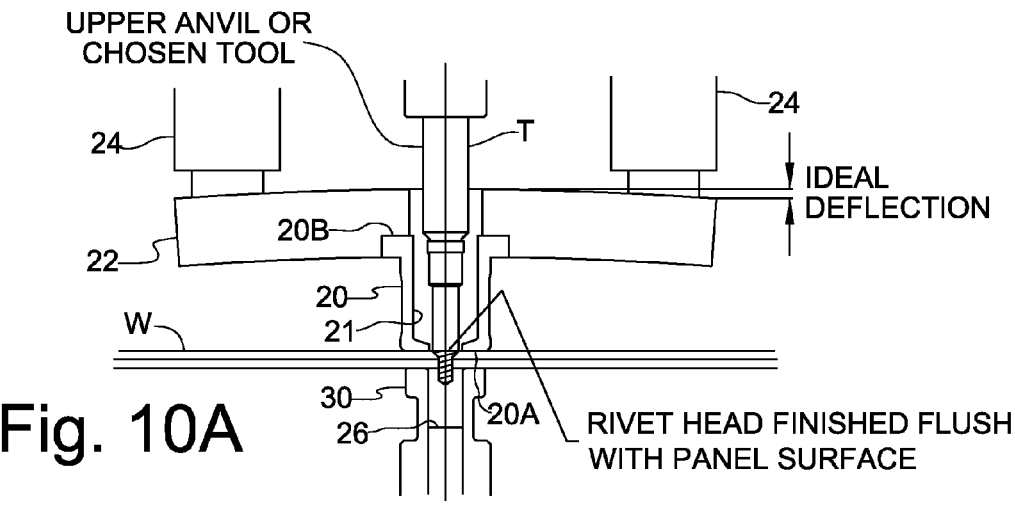
FIG. 10A is schematic view showing expected deflection of a pressure foot plate under design conditions and correct installation of a rivet.
Figure 10B:
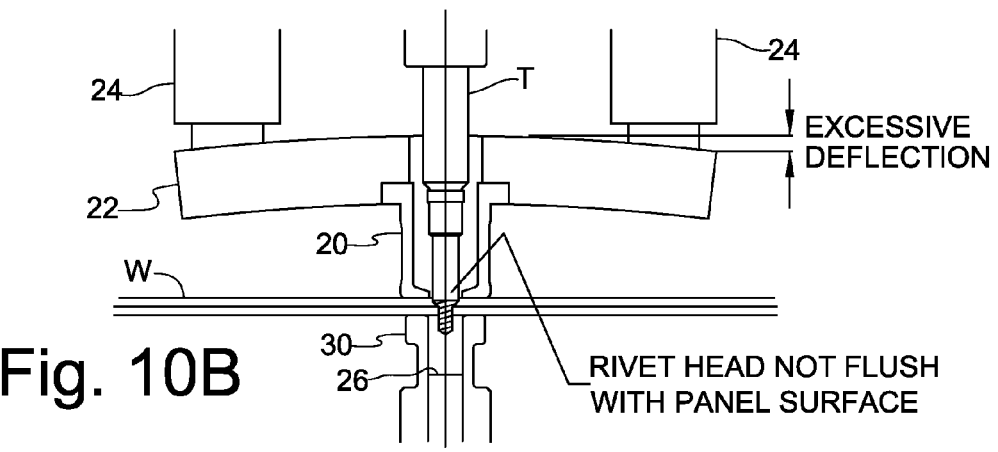
FIG. 10B is a schematic view similar to that of FIG. 10A showing excessive deflection of the pressure foot plate and resulting incorrect installation of a rivet.
Figure 10C:
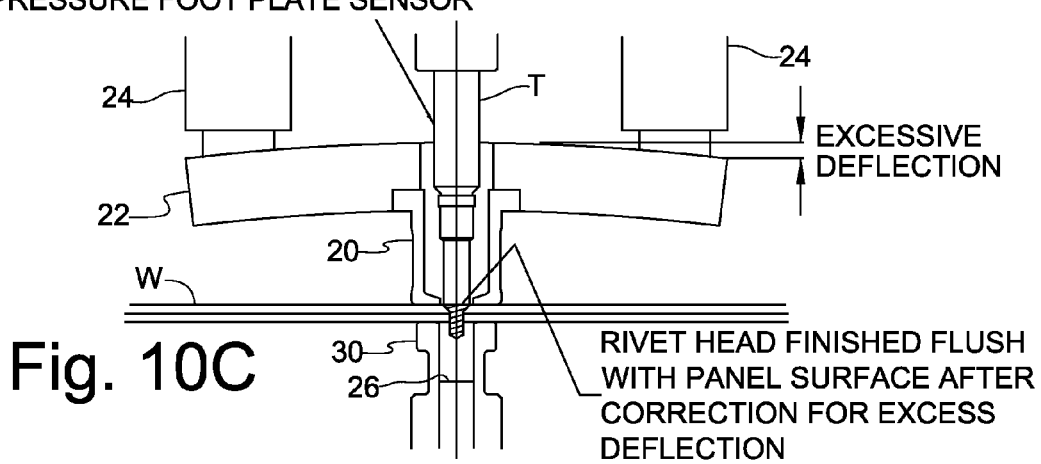
Figure 11A:
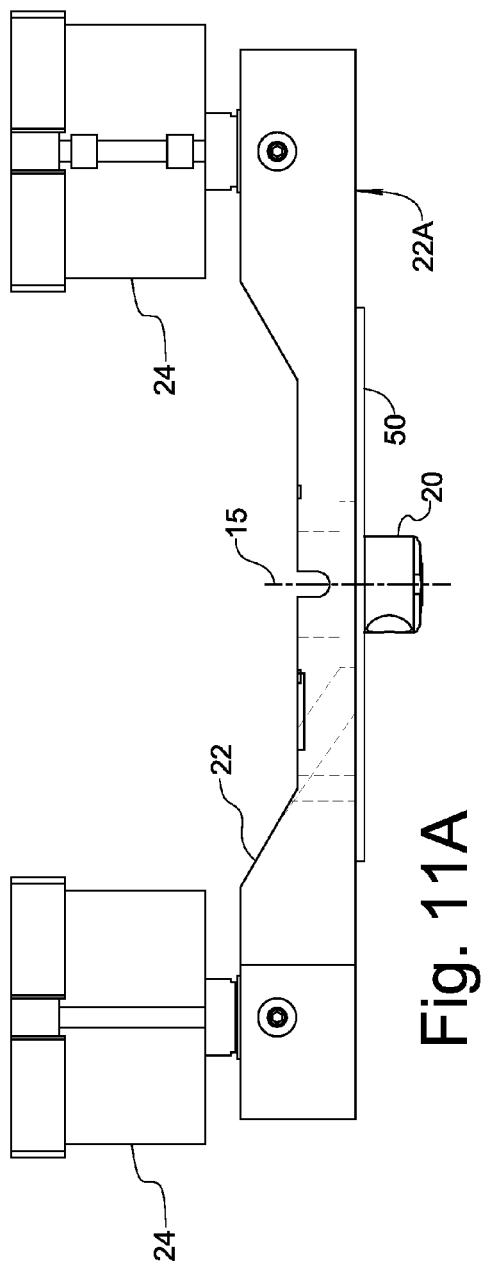
Figure 11B:
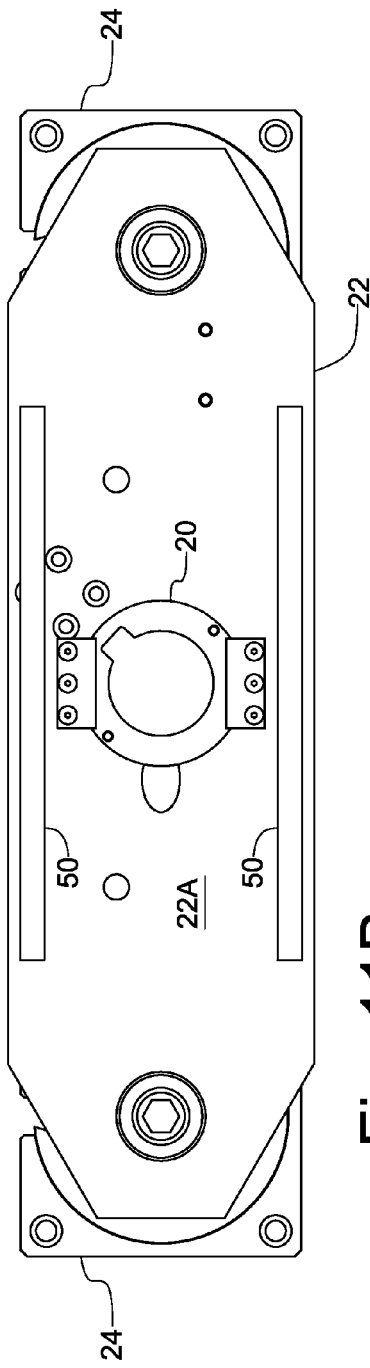
Figure 13A:
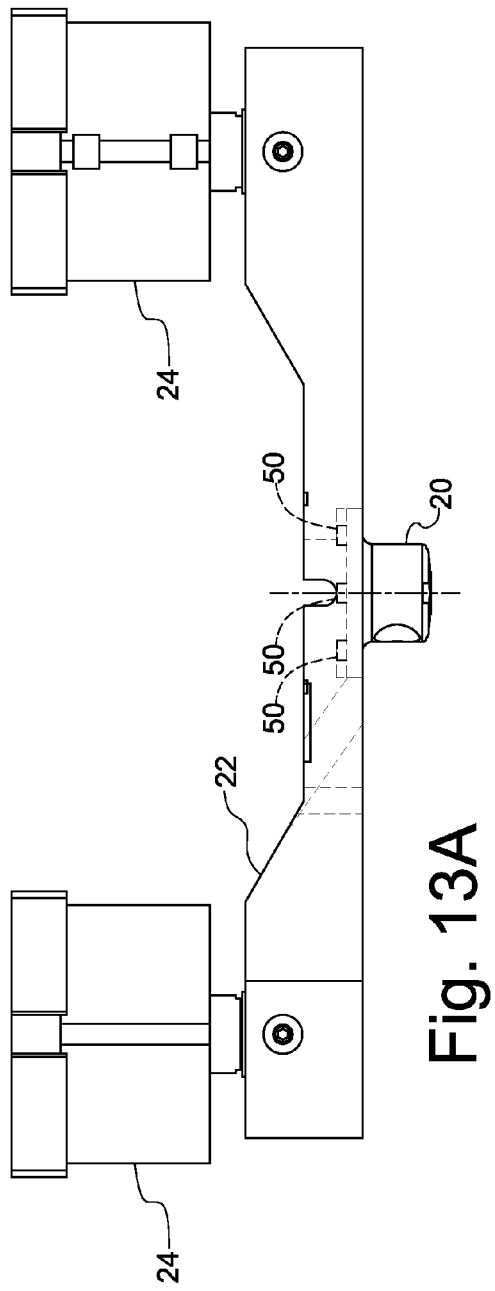
Figure 13B:
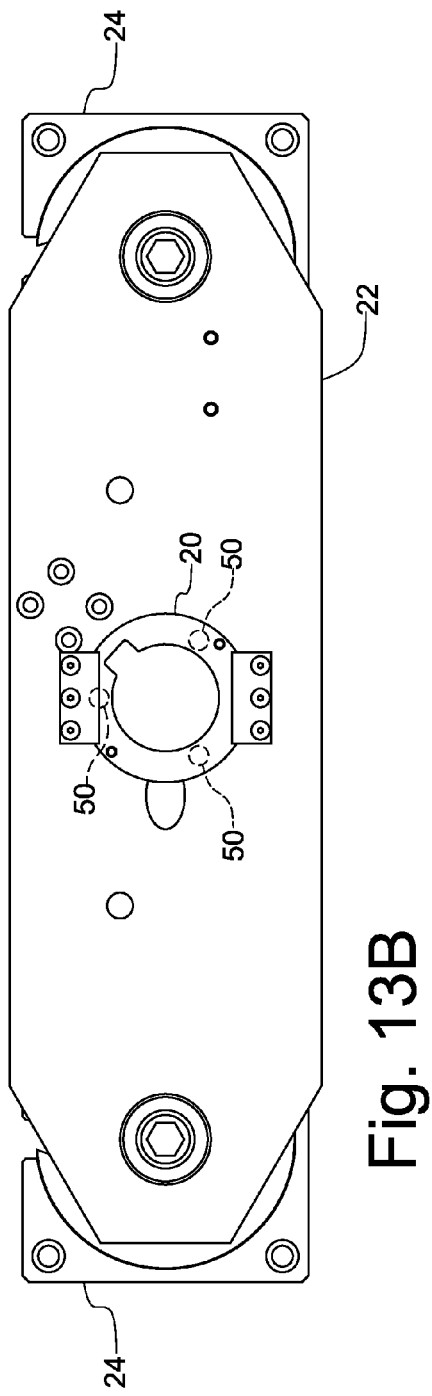
Figure 14:
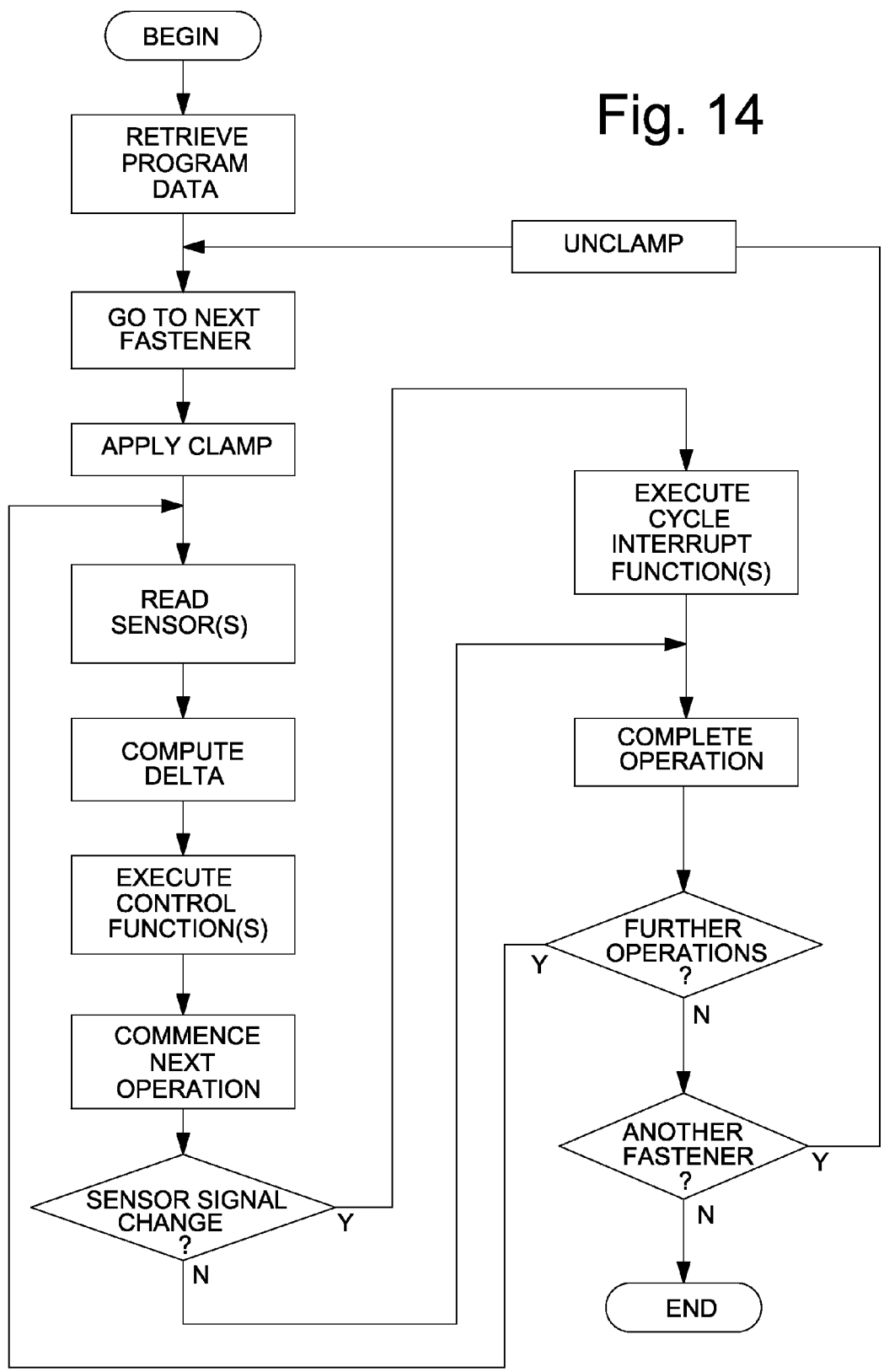
Figure 15:
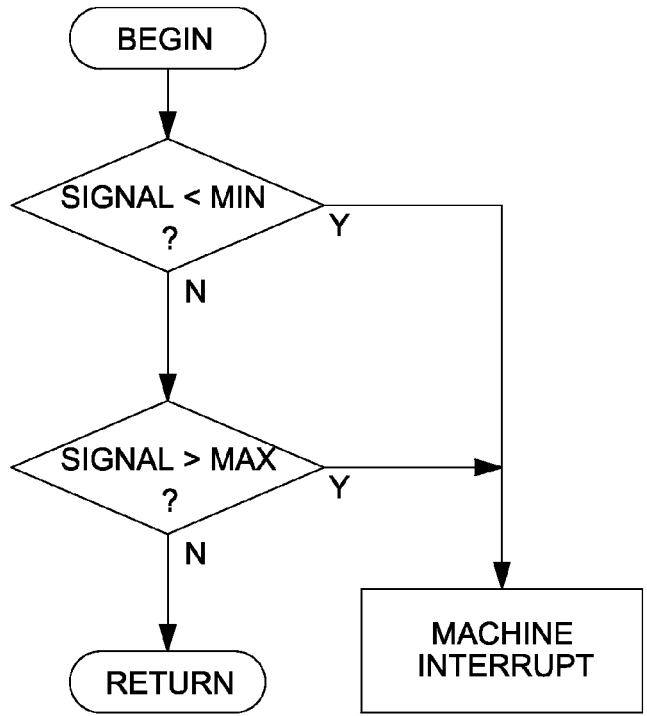
Figure 16:
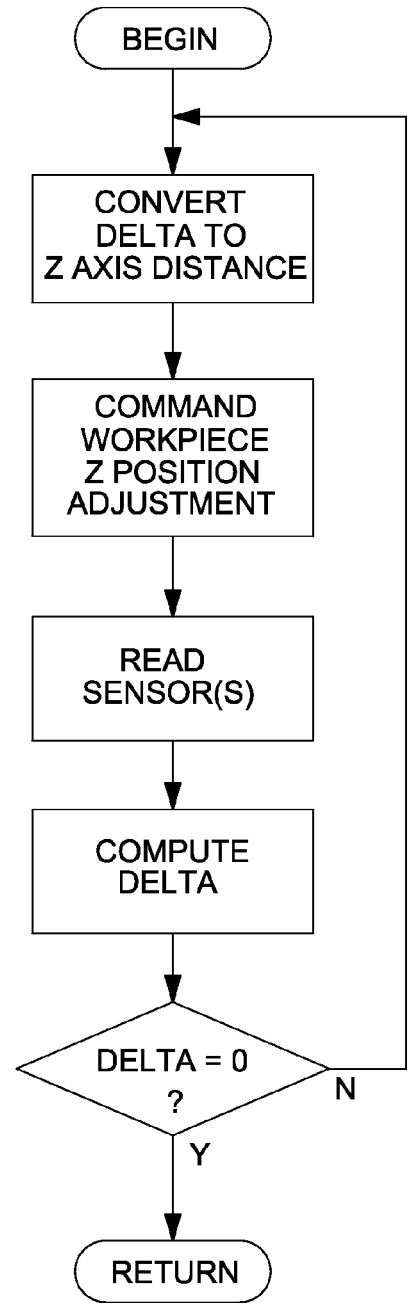
Figure 17:
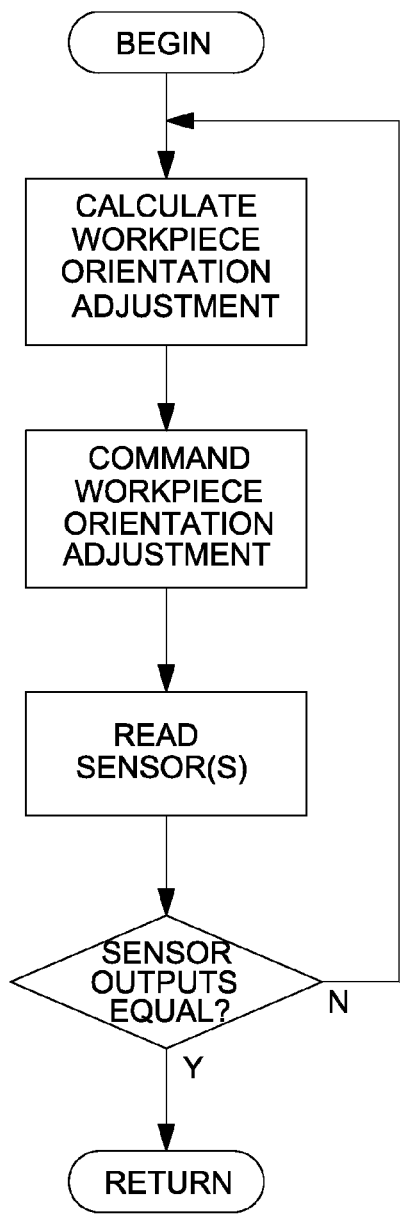
Figure 18:
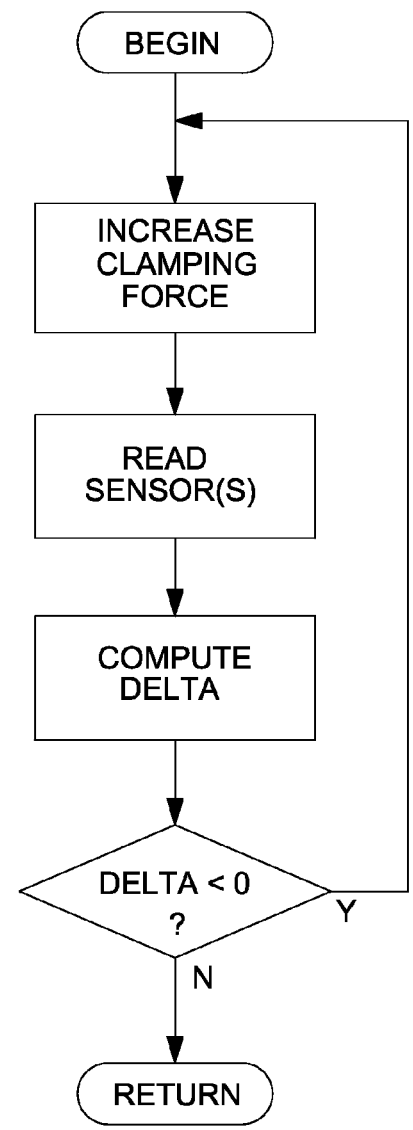
Figure 19:
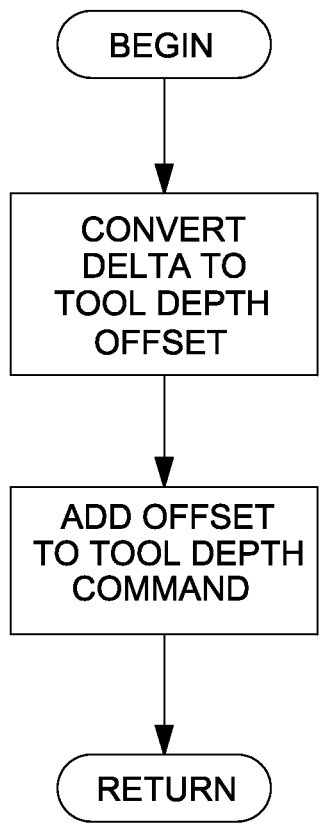
Figure 20:
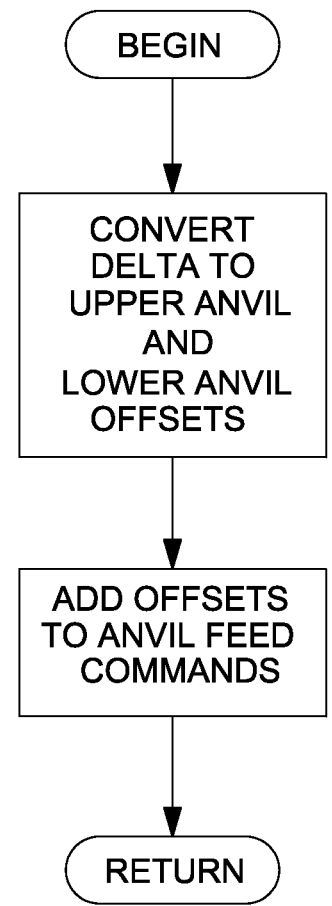
Figure 21:
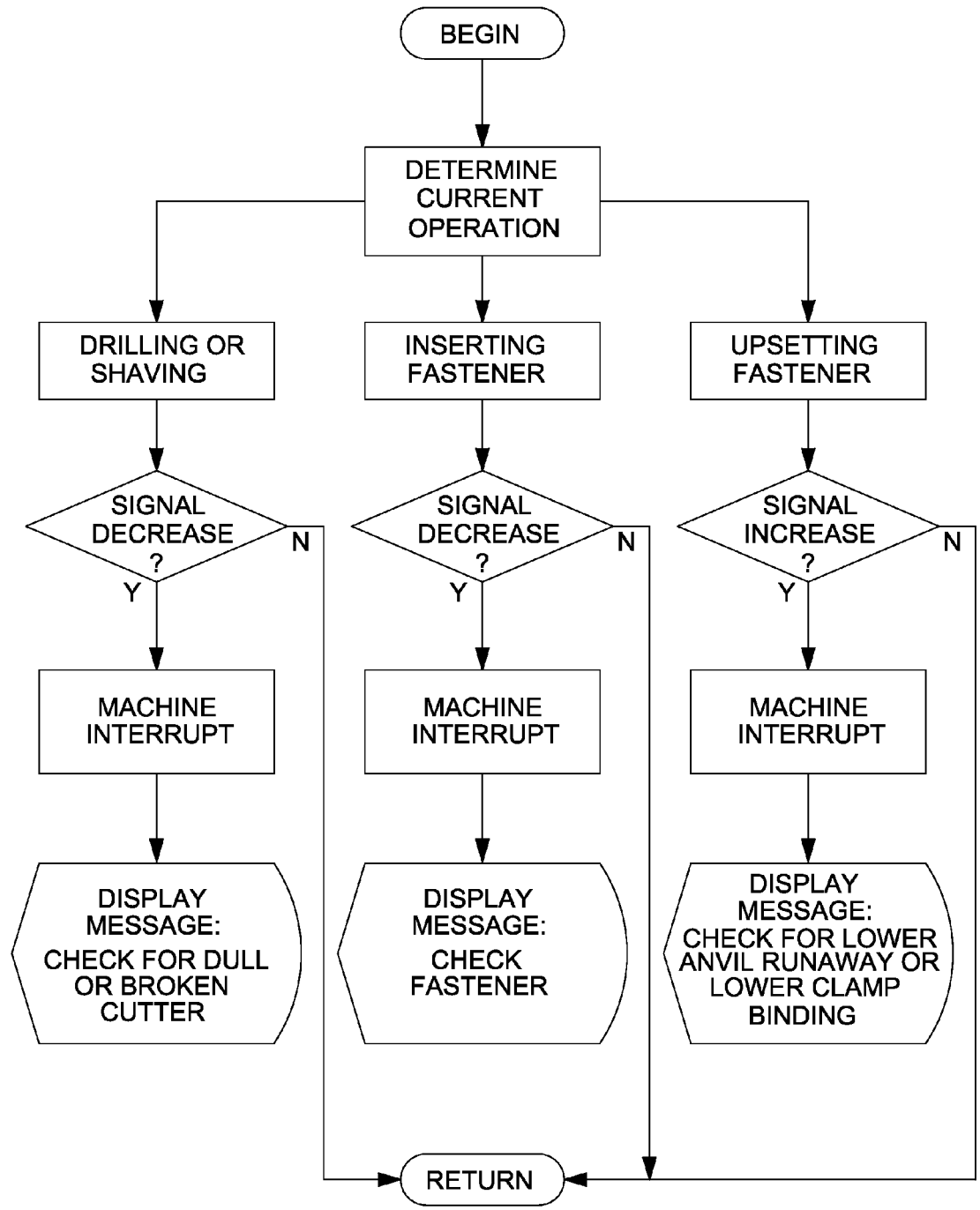

FIG. 10C is a schematic view similar to that of FIG. 10B, wherein excessive pressure foot deflection is compensated for in tool motion commands to achieve correct installation of the rivet in accordance with an embodiment of the present FIG. 11A is a front view of a pressure foot plate assembly formed in accordance with a first embodiment of the present invention, wherein a pair of strain gauges are installed on the pressure foot plate to measure deflection;

FIG. 11B is a bottom plan view of the pressure foot plate assembly shown in FIG. 11A;

FIG. 12A is a front view of a pressure foot plate formed in accordance with a second embodiment of the present invention, wherein a ring-shaped load cell is arranged to measure force transmitted between the pressure foot plate and the pressure foot bushing;

FIG. 12B is a bottom plan view of the pressure foot plate assembly shown in FIG. 12A;

FIG. 13A is a front view of a pressure foot plate formed in accordance with a third embodiment of the present invention, wherein a polar array of load cells is arranged to measure force transmitted between the pressure foot plate and the pressure foot bushing;

FIG. 13B is a bottom view of the pressure foot plate shown in FIG. 13A;

FIG. 14 is a schematic flow diagram generally illustrating logic for controlling an automatic riveting apparatus based on sensor output in accordance with an embodiment of the present invention;

FIG. 15 is a schematic flow diagram illustrating logic of a clamping error control function in accordance with an embodiment of the present invention;

FIG. 16 is a schematic flow diagram illustrating logic of a panel position control function in accordance with an embodiment of the present invention;

FIG. 17 is a schematic flow diagram illustrating logic of a workpiece orientation normalization control function in accordance with an embodiment of the present invention;

FIG. 18 is a schematic flow diagram illustrating logic of a clamping force control function in accordance with an embodiment of the present invention;

FIG. 19 is a schematic flow diagram illustrating logic of a countersink tool or shave tool offset control function for correcting countersink depth or shave depth in accordance with an embodiment of the present invention;

FIG. 20 is a schematic flow diagram illustrating logic of a buck position control function for correcting anvil buck position in accordance with an embodiment of the present invention; and FIG. 21 is a schematic flow diagram illustrating logic of a cycle interrupt function in accordance with an embodiment of the present invention.

DETAILED DESCRIPTION OF THE INVENTION

Figure 2:
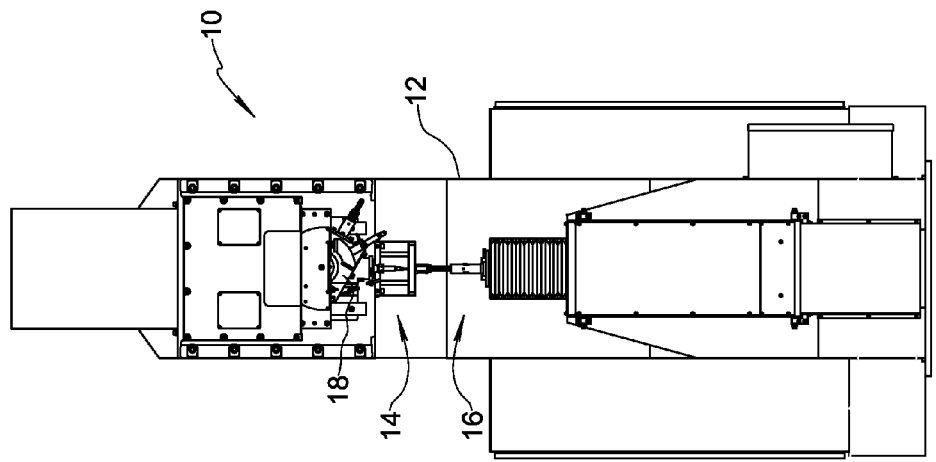
FIG. 2 is a front elevation view of the C-frame riveting apparatus shown in FIG. 1.
Figure 1:
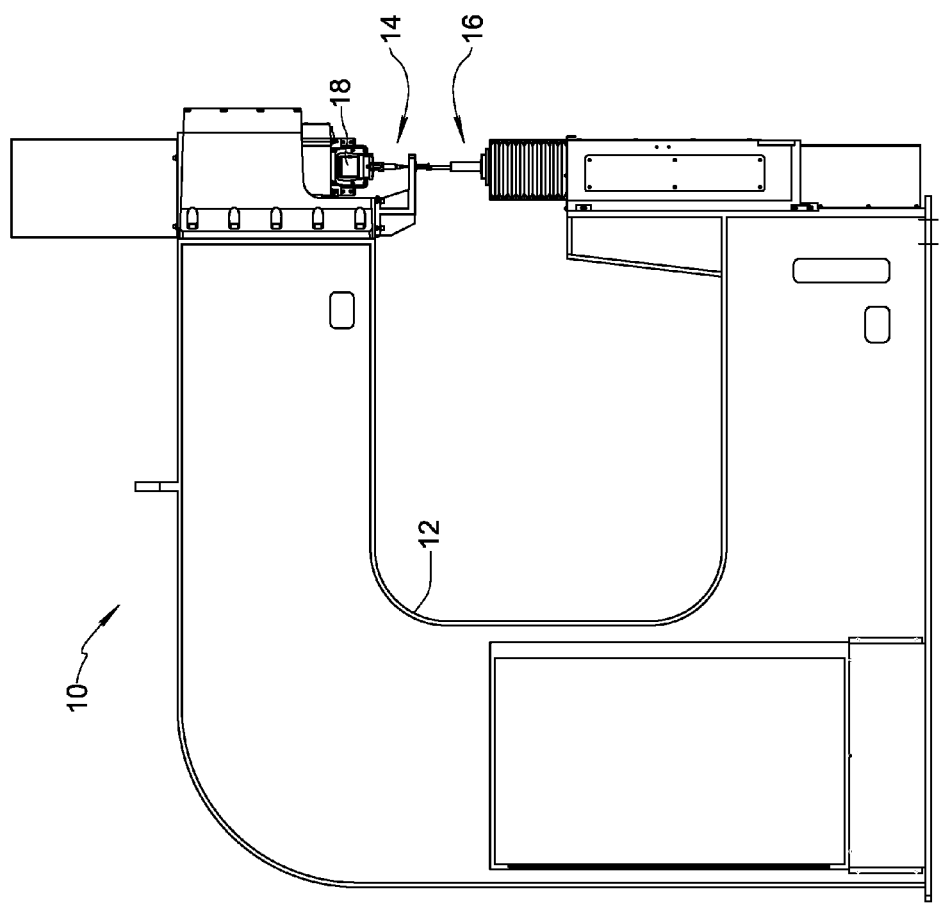
FIG. 1 is a side elevation view of a C-frame automatic riveting apparatus embodying the present invention.
Figure 3:
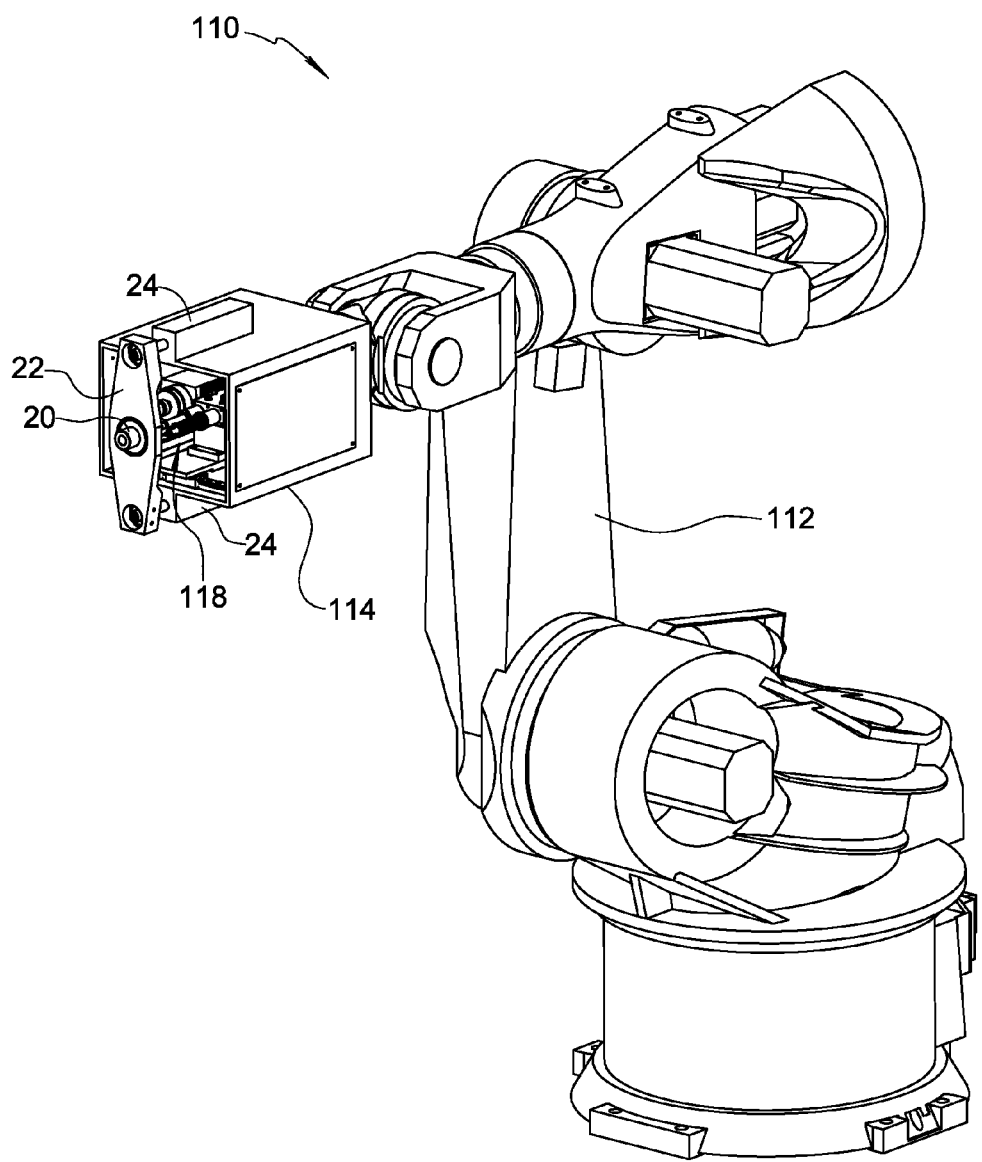
FIG. 3 is a perspective view showing a robot arm riveting apparatus embodying the present invention.
Figure 5:
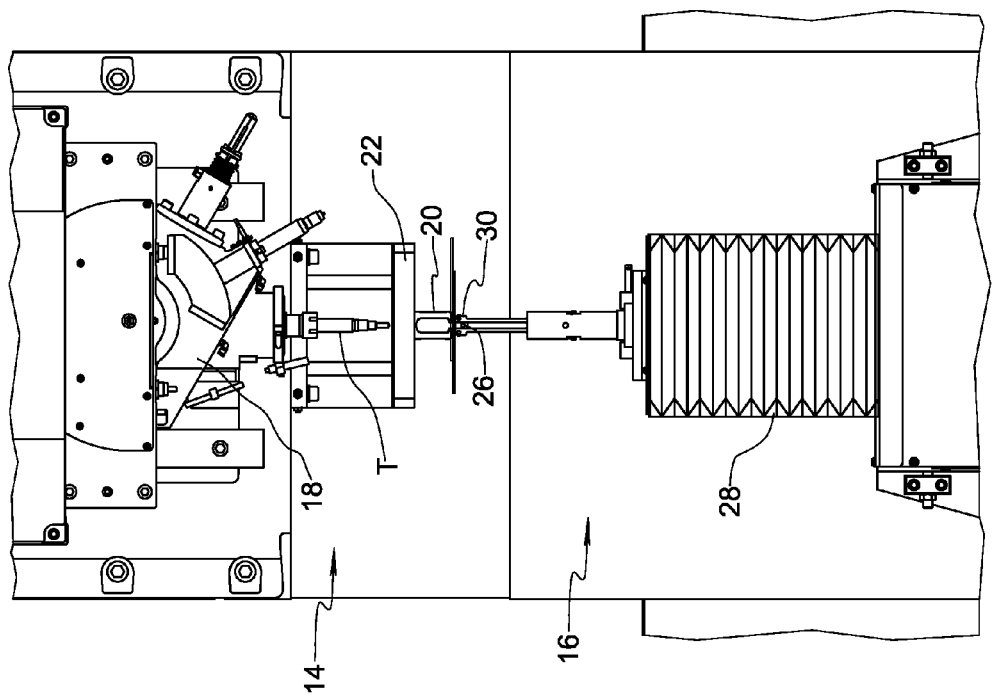
FIG. 5 is a front elevation view of the head assembly and workpiece shown in FIG. 4.
Figure 6:
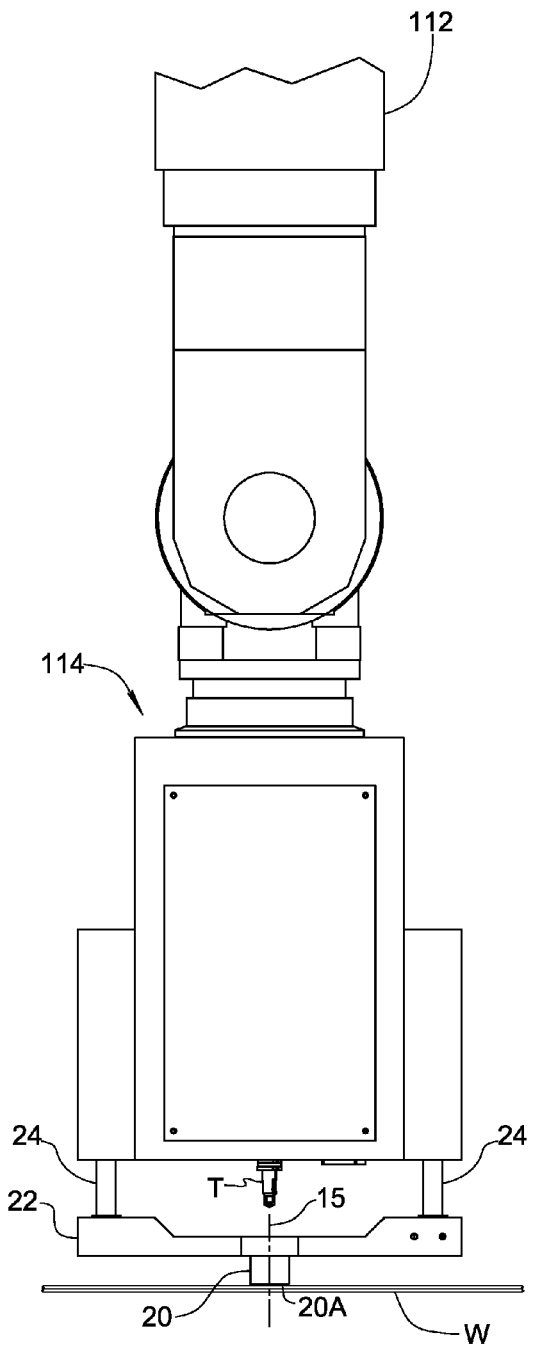
FIG. 6 is a front elevation view of an end effecter of the robot arm riveting apparatus shown in FIG. 3, with a stack of panels positioned as a workpiece.
Figure 7:
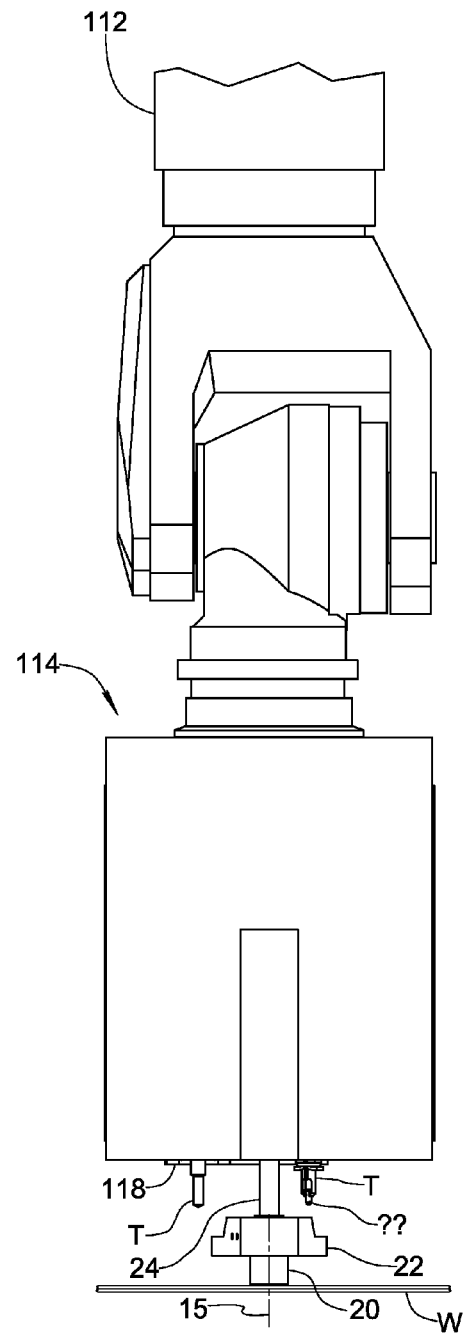
FIG. 7 is a side elevation view of the end effecter and workpiece shown in FIG. 6.

FIGS. 1-2 and 4-5 illustrate an automatic riveting apparatus 10 in the form of a C-frame riveting machine. FIGS. 3 and 6-7 illustrate an automatic riveting apparatus 110 in the form a robotic arm riveting machine. General reference is also made to the schematic diagram of FIG. 9. As will be apparent from the description to follow, the present invention finds application in a variety of automatic riveting apparatus, including but not limited to the two types mentioned above. The present invention is concerned with controlling an automatic riveting apparatus taking into account force transmitted between a pressure foot plate and a pressure foot bushing found in a machining head assembly of the apparatus. The control functions provided in accordance with the present invention offer improved fastening quality in the finished workpiece, decreased scrap rate, and safety interruption of the automated fastening process.

Figure 4:
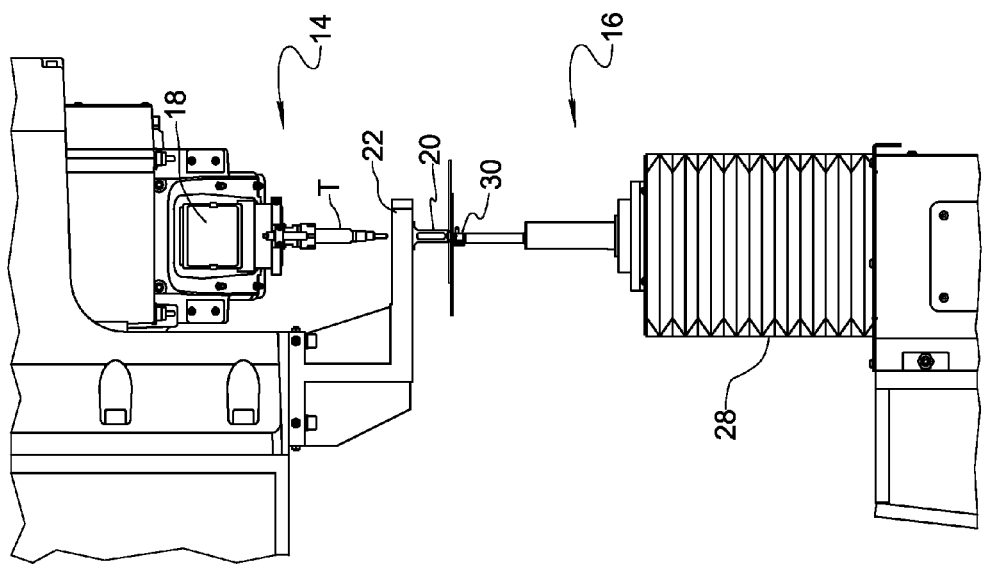
FIG. 4 is a side elevation view of the head assembly of the C-frame riveting apparatus shown in FIGS. 1 and 2, with a stack of panels positioned in the head assembly as a workpiece.

Looking first at C-frame riveting machine 10, it comprises a C-shaped body 12, an upper head assembly 14, a lower head assembly 16, and a tool transfer assembly 18 associated with upper head assembly 14. A work positioner 11 is schematically represented in FIG. 10 and is operable to position a workpiece W, such as a structural panel or stack of panels of an aircraft, between upper head assembly 14 and lower head assembly 16, whereby various operations may be performed to install a fastener, for example a rivet, at a desired location in the workpiece. As best seen in FIGS. 4 and 5, riveting machine 10 has a tool axis 15 along which a tool T, for example a drill and countersink bit, a rivet feeder, an anvil, or a shaving tool, is movable to engage workpiece W and/or a fastener. As used herein, the word "tool" is intended to have a broad meaning and to include an item held by tool transfer assembly 18 and selectable to be actuated along tool axis 15 for carrying out an operation in a fastener installation process. Tool T may also be rotatable about tool axis 15 for performing a particular operation, for example drilling or shaving the head of an upset rivet.

Looking next at robotic arm riveting machine 110 shown in FIGS. 3 and 6-7, it comprises a head assembly 114, also referred to as an "end effecter," at the distal end of an articulated robotic arm 112, and a tool transfer assembly 118 associated with end effecter 114. Robotic arm 112 is operable to position end effecter 114 relative to a workpiece W so that various operations may be performed to install a fastener, for example a rivet, at a desired location in the workpiece. Similar to C-frame riveting machine 10, robotic arm riveting machine 110 has a tool axis 15 along which a tool T is movable to engage workpiece W and/or a fastener. Various tools T are held by tool transfer assembly 118 and are selectable to be actuated along tool axis 15 for carrying out an operation in a fastener installation process. Some tools T carried by tool transfer assembly 118 of end effecter 114 may also be rotatable about tool axis 15 for performing a given operation. As may be understood, robotic arm riveting machine 110 does not have a second head assembly opposite end effecter 114.

Upper head assembly 14 of C-frame riveting machine 10 and end effecter 114 of robotic arm riveting machine 110 have certain features in common. Each includes a pressure foot bushing 20 having a clamping end 20A for engaging a surface of workpiece W, a supported end 20B opposite clamping end 20A, and a passage 21 sized and arranged such that each tool T is movable along tool axis 15 through pressure foot bushing 20 to engage workpiece W and or a fastener in the workpiece. Both upper head assembly 14 and end effecter 114 have a pressure foot plate 22 coupled to the supported end 20B of pressure foot bushing 20. In each case, the pressure foot plate 22 may be actuated by a pair of linear actuators 24 arranged symmetrically on opposite sides of tool axis 15 to apply force to pressure foot plate 22 to move the pressure foot plate toward and away from workpiece W. By operating linear actuators 24, pressure foot plate 22 may be actuated to cause pressure foot bushing 20 to exert a clamping force against a surface of workpiece W. In the case of C-frame riveting machine 10, an alternative arrangement (shown in FIGS. 1-2 and 4-5) is possible wherein the pressure foot plate 22 is fixedly mounted on the machine frame or body 12, and lower head assembly 16 includes a lower clamp sleeve 30 for engaging workpiece W opposite pressure foot bushing 20 and for accommodating a lower anvil 26. Lower clamp sleeve 30 may be moved in opposite directions along tool axis 15 by a linear actuator assembly 28. Thus, in the alternative arrangement, pressure foot plate 22 is held at a predetermined location to cause pressure foot bushing 20 to oppose a clamping force exerted against the opposite surface of workpiece W by lower clamp sleeve 30 in a direction toward clamping end 20A of pressure foot bushing 20 (upward in FIGS. 4 and 5). Lower anvil 26 may be independently movable through a passage in clamp sleeve 30 for "squeeze-squeeze" riveting in which pressure is actively applied to both ends of the rivet slug, or lower anvil 26 may be fixed relative to clamp sleeve 30 to fixedly seat the lower end of the rivet slug.

Figure 8:
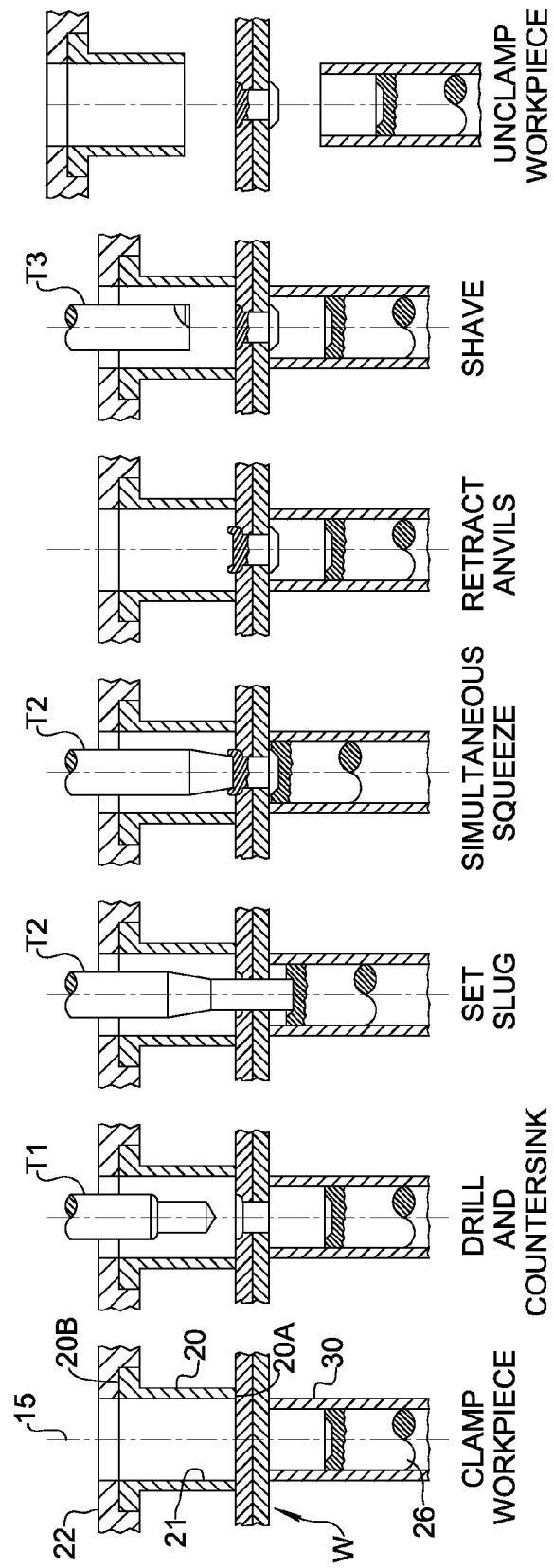
FIG. 8 is a series of illustrations depicting various operations performed by an automatic riveting apparatus to install a rivet in a workpiece.

FIG. 8 illustrates automated sequential operations of a squeeze-squeeze rivet installation cycle. Once workpiece W has been brought into proper position to align the intended fastener location with tool axis 15, the workpiece is clamped between lower clamp sleeve 30 and pressure foot bushing 20 by actuating lower clamp sleeve 30 and pressure foot plate 22 in opposite Z-directions. Tool T1, a drill and countersink tool, is fed downward along tool axis 15 through passage 21 in pressure foot bushing 20 to engage workpiece W and form a drilled hole with countersink. Lower anvil 26 is positioned to support the bottom end of a rivet slug inserted by tool T2, which may be an upper anvil operable to press insert the fastener, another type of fastener insertion tool. Simultaneous squeezing is performed by actuating upper anvil T2 and lower anvil 26 to upset the ends of the slug. The upper and lower anvils are retracted, and excess material is shaved from the top end of the rivet by a shaving tool T3 to bring the top end flush with the adjacent surface of workpiece W. Finally, workpiece W is unclamped to allow repositioning and repeat of the cycle to install another fastener. While a squeeze-squeeze process is illustrated, variations wherein either the upper anvil or the lower anvil is held at a fixed position while the other anvil is moved along the tool axis are also known to those skilled in the art.

Figure 9:
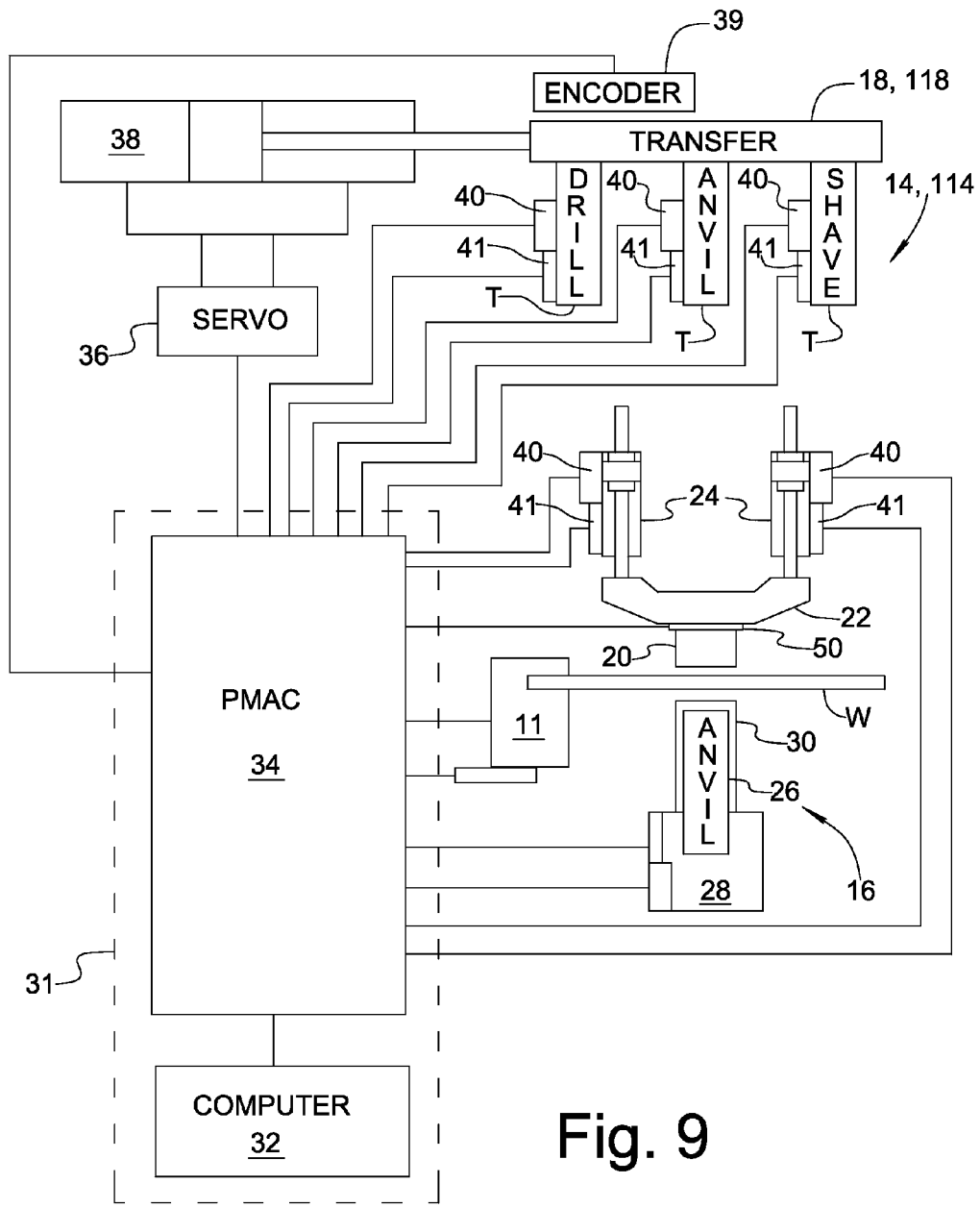
FIG. 9 is a schematic block diagram showing a control system of an automatic riveting apparatus in accordance with an embodiment of the present invention.

The operations described above may be performed automatically using one of several motion control options, including for example computer numerical control (CNC), programmed logic control (PLC), and a programmable multi-axis controller (PMAC). FIG. 9 is a schematic diagram of one possible control system 31 that includes a computer workstation 32 connected to a PMAC 34 for allowing an operator to interface with the PMAC to program fastening jobs. PMAC 34 provides motion commands to operate a servo valve 36 for driving an actuator 38 to index tool transfer assembly 18 or 118 for selecting a desired tool T carried by the tool transfer assembly. A feedback sensor, for example an encoder 39, is arranged to detect the tool index position of tool transfer assembly 18 or 118 and provide a signal back to PMAC 34. The various tools T have associated drive motors 40 and feedback sensors 41 connected to PMAC 34, whereby tool feed along tool axis 15 and tool rotation about tool axis 15 can be servo-controlled to achieve desired tool motion. Linear actuators 24 connected to pressure foot plate 22 are also servo-controlled to follow motion commands from PMAC 34. Similarly, actuators in lower anvil actuator assembly 28 for moving lower anvil 26 and lower clamp sleeve 30 are servo-controlled by commands from PMAC 34. Finally, workpiece W may be carried by a workpiece positioning unit 11 servo-controlled by PMAC 34, and/or the head assembly 114 may be positioned relative to a fixed workpiece under servo-control from PMAC 34, to locate tool axis 15 at a desired location relative to workpiece W. Thus, the control system controls tool selection and motion, clamping force, workpiece position relative to tool axis 15 and pressure foot bushing 20, and angular orientation of the workpiece relative to tool axis 15 and pressure foot bushing 20. As will be recognized by those having ordinary skill in the art of automated riveting machines, the control architecture shown in FIG. 9 and described above is known and is subject to variation depending upon the type of machine and operations being controlled. Further control system details may be found in commonly-owned U.S. Pat. Nos. 6,295,710 and 6,427,312, the entire disclosures of both patents being incorporated herein by reference.

Reference is now made to FIGS. 10A through 10C as groundwork for understanding the present invention. FIG. 10A shows an operation being performed under ideal (i.e. expected) machining conditions. As illustrated in exaggerated scale, pressure foot plate 22 undergoes a slight deflection when it is actuated to cause pressure foot bushing 20 to exert a clamping force against the surface of workpiece W. A similar deflection occurs in configurations where pressure foot plate 22 is held at a predetermined location to cause pressure foot bushing 20 to oppose a clamping force exerted against another surface of the workpiece toward the clamping end 20A of the pressure foot bushing, such as by an actuated lower clamping sleeve 30. As recognized by the inventor, the force transmitted between the pressure foot plate and the pressure foot bushing provides information about the workpiece clamping conditions and other operational conditions critical to fastener installation quality control and in some cases operator safety. The deflection exhibited by pressure foot plate 22 is proportional to the transmitted force. Deviation of the transmitted force or the deflection from an ideal amount, for example excess deflection as illustrated by FIG. 10B, is an indication that a clamping adjustment, positional correction, and/or a safety response is desirable. The present invention provides an apparatus and method for measuring the force or proportional deflection at pressure foot plate 22 and commanding one or more control functions based on the measurement. By way of example, FIG. 10C illustrates a positional correction of an upper anvil stroke length to provide a flush rivet head finish under the excess deflection scenario of FIG. 10B.

In accordance with the present invention, at least one sensor 50 is connected to pressure foot plate 22 for generating a respective sensor signal indicative of force transmitted between the pressure foot plate 22 and the pressure foot bushing 20. In a first embodiment shown in FIGS. 11A and 11B, the at least one sensor 50 is a pair of strain gauges 50 affixed to an undersurface 22A of pressure foot plate 22. As best seen in FIG. 11B, strain gauges 50 may be arranged parallel to one another and symmetrically about tool axis 15. As will be understood, strain gauges 50 measure deflection of pressure foot plate 22 and provide respective signals having an amplitude proportional to force transmitted between the pressure foot plate 22 and the pressure foot bushing 20. The signals may be combined to provide a single output signal, or kept separate. It is also possible to use only one strain gauge 50, or more than two strain gauges 50. A strain gauge having a deflection capacity of 0.015" over 8.13" length, 2% nominal accuracy, an output of 1-2 mV/V nominal, excitation of 10V DC, a bridge resistance of 350 Ohms, and an operating temperature range from 10° F.-200° F. has been found suitable for practicing the present invention. Strain gauge Part No. 406A1183 measuring 4" long by 0.25" wide by 0.16" thick available from Gemcor of West Seneca, N.Y. meets these requirements.

Those skilled in the art will understand that it is possible to use other types of sensors for detecting deflection of pressure foot plate 22. For example, an encoder, position transducer, probe or other distance measuring device may be used as sensor 50.

FIGS. 12A and 12B show a second embodiment wherein the at least one sensor 50 includes a ring-shaped load cell arranged between an inner shoulder 22B of pressure foot plate 22 and the supported end 20B of pressure foot bushing 20. Load cell 50 should be chosen to allow sufficient Z-axis travel of the pressure foot plate 22 relative to pressure foot bushing 20 under maximum anticipated loading to prevent the load cell from "bottoming out".

FIGS. 13A and 13B show a third embodiment wherein the at least one sensor 50 includes a plurality of individual load cells arranged in an angular array about tool axis 15 between inner shoulder 22B of pressure foot plate 22 and supported end 20B of pressure foot bushing 20. Load cells 50 are preferably arranged at regular angular intervals about tool axis 15 and at a common radial distance from the tool axis. The embodiment depicted in FIGS. 13A and 13B has three load cells arranged at 120-degree intervals, however more than three load cells may be provided. The output signals from load cells 50 may be combined to provide a single output signal, or kept separate. As will be apparent from description below, this third embodiment with separate output signals from load cells 50 may be utilized for positioning the surface of workpiece W in a plane normal to tool axis 15. Again, load cells 50 should be chosen to allow sufficient Z-axis travel of the pressure foot plate 22 relative to pressure foot bushing 20 under maximum anticipated loading to prevent the load cells from "bottoming out".

As will now be described with reference to FIGS. 14-21, the control system 31 of C-frame riveting machine 10, and that of robotic arm riveting machine 110, is configured to command at least one of the following control functions based at least in part on a value of the signal(s) from the at least one sensor 50: (i) control motion of the tool T, (ii) control the clamping force, (iii) control a position of workpiece W, (iv) control an angular orientation of workpiece W relative to the pressure foot bushing 22, and (v) trigger a safety mode. The control functions may be stored as software instructions stored in a memory accessible by control system 31.

FIG. 14 illustrates, in a generalized manner, logic for controlling automatic riveting apparatus 10, 110 based on output signals from the at least one sensor 50. It is assumed that apparatus 10, 110 has already been set up to run certain fasteners by running test coupons to determine automation parameters for running production panels, thereby providing a programmed recipe that may be stored and retrieved for use in running production panels. The control system retrieves the program, and receives any necessary operator inputs. Execution proceeds and the control system positions the workpiece by commanding positioning unit 11, and/or positions the head assembly 118 by commanding robotic arm 112, such that the tool axis 15 is aligned with the intended location of the fastener in the workpiece. Then, actuators 24, and/or lower actuator assembly 28, are commanded to clamp the workpiece between clamping end 20A of pressure foot bushing 20 and lower clamping sleeve 30 or a fixture supporting the workpiece.

Once the clamp is applied, the output signal from the at least one sensor 50 is read and then compared with a reference signal obtained during coupon testing. A "delta" value may be computed, defined as the difference between the current signal value and the reference signal value. The sensor(s) 50 may be calibrated against independent deflection distance measurements so that delta value may be converted to distance units representing an amount of deflection less than or greater than the ideal deflection distance. In accordance with the present invention, one or more control functions may be executed that take the delta value or simply the absolute signal value into account. The various control functions are described later herein with reference to FIGS. 15-21. The control functions executable immediately after clamping may trigger a safety mode if a clamping error is detected, modify workpiece position and/or orientation, adjust the clamping force, and provide offsets or corrections to the programmed motion commands for the tools.

Once the control functions have been executed, the sequence of programmed operations is commenced. The signal from the at least one sensor 50 is monitored while operations are performed. If the signal changes by at least a predetermined threshold amount, a special subset of control functions referred to in FIG. 14 as cycle interrupt functions may be executed. An example of this type of control function is described below with reference to FIG. 21. If the signal does not experience a change sufficient to trigger a cycle interrupt function, the operation is completed. If further operations are required by the program at the current fastener location, flow proceeds to the next operation in the sequence. If not, and there is another fastener to be installed, the workpiece is unclamped and flow proceeds to the next fastener. If there are no more fasteners to install, execution terminates.

FIG. 15 illustrates flow of a clamping error control function executable by control system 31 based on the delta calculation. The clamping error function looks for a condition wherein the clamping force or associated deflection is either less than a predetermined minimum threshold or greater than a predetermined maximum threshold, and interrupts machine operation so that remedial measures may be taken by the operator. If adequate clamping force or deflection is not seen, the workpiece may be under-clamped and may spin during a drilling operation and thereby injure personnel. The lack of any deflection means the pressure foot bushing is not contacting the panel at all or a panel is not present at the location the machine senses there is a panel. If clamping force or deflection exceeds a predetermined maximum threshold, there may be a foreign object between pressure foot bushing 20 and the workpiece W. The clamping error control function triggers a safety mode wherein machine operation is interrupted if either of these conditions is met.

FIG. 16 illustrates flow of a panel position control function executable by control system 31 based on the delta calculation. The panel position control function adjusts the position of the workpiece along tool axis 15 (the Z axis) to achieve a condition wherein the deflection of the pressure foot plate 22 during clamping is substantially equal to the ideal deflection (i.e., the delta value is approximately zero). In the scheme shown, the delta value is used to calculate a Z axis adjustment distance, and workpiece positioning unit 11 is commanded to change the Z axis position of the workpiece accordingly. For example, if excessive deflection is indicated, then the workpiece is moved away from pressure foot bushing 20, and if insufficient deflection is indicated, then the workpiece is moved toward pressure foot bushing 20 (the workpiece may remain clamped, or it may be unclamped before being moved and then re-clamped after being moved). The at least one sensor 50 is read and the delta value is determined to confirm the delta value is substantially equal to zero. If not, further adjustment is made until the delta value is tolerably close to zero. The control scheme may be a servo-control loop taking the sensor signal to its ideal reference value or taking the delta value to zero.

FIG. 17 shows a workpiece orientation normalization control function usable in situations where a plurality of load cells 50 are arranged in a polar array about tool axis 15 as depicted in FIG. 13B. If the individual output signals from the various load cells 50 are unequal, it is an indication that tool axis 15 is not normal to the surface of workpiece W engaged by pressure foot bushing 20. The normalization control function adjusts the angular orientation of the workpiece to equalize the respective sensor signals. If a robotic arm machine 110 is used, the angular orientation of end effecter 114 may be adjusted instead of tilting the workpiece. When the sensor outputs have been equalized, flow returns to the main program.

FIG. 18 illustrates flow of a clamping force control function that may be called by control system 31 in accordance with an embodiment of the present invention. The function may be called where the sensor signal(s) indicate that insufficient force is imparted to pressure foot bushing 20 in the clamped state. The principle behind the clamping force control function is to increase the clamping force until the ideal sensor signal value is achieved (delta value goes to zero). A servo-control loop may be used. The clamping force adjustment method will depend upon the type of machine being used. Where actuators 24 are used to press pressure foot plate 22 and pressure foot bushing 20 toward the workpiece, then commands may be sent to drive actuators 24. Where lower actuator assembly 28 is used to force lower clamping sleeve 30 against the workpiece, then commands may be sent to drive lower actuator assembly 28.

FIG. 19 illustrates a tool offset function which improves flushness of the fastener head with the workpiece surface by including an offset in the drill/countersink depth of feed command and/or in the shave tool depth of feed command as a function of the observed delta. As FIGS. 10A-10C make clear, if non-ideal deflection is present in pressure foot plate 22, the depth of feed of a given tool T along tool axis 15 relative to workpiece W will not be as expected. For example, if excessive deflection is present for a drill and countersink tool operation, the countersink depth will be too deep, and vice versa. Similarly, if excessive deflection is present for a shave tool operation, the shave tool depth will be too deep, and vice versa. Consequently, the rivet head will not be flush with the surface of the workpiece, and/or workpiece damage may occur. The tool offset function of FIG. 19 applies an offset to the tool motion command based on the measured delta to achieve flushness tolerances. Correcting the countersink and shave tool commands in accordance with the present invention enables the machine to meet a flushness to airframe tolerance of 0.000" to 0.002".

FIG. 20 shows schematic flow of a buck position control function for adjusting anvil feed position during a fastener insert operation to fully seat a press insert fastener without downwardly deforming the workpiece. The buck position control function will also ensure the workpiece is not deformed upwardly or downwardly during a fastener squeeze cycle. Based on the measured delta, offsets are calculated for the upper anvil and lower anvil feed positions, and the offsets are applied to the anvil motion commands that control the fastener insert operation and the squeeze operation.

FIG. 21 depicts a cycle interrupt function whereby control system 31 triggers a safety mode during the programmed sequence of operations executed to install a fastener if a change in the signal from sensor 50 is observed beyond a threshold allowing for typical small fluctuations. If the current operation is a drilling or shaving operation and the sensor signal decreases, this may indicate a dull or broken cutter. A safety mode is triggered wherein machine operation is interrupted and an error message is displayed on computer 32 directing the operator to check for a dull or broken tool.

If the current operation is inserting and setting the fastener and the sensor signal decreases, this may indicate a tipped fastener, meaning the fastener is pushing on the workpiece near the drilled hole and is not entering the hole itself. It can also indicate that the fastener is too large in diameter to fit in the drilled hole, or that there is no hole present at all. A safety mode is triggered wherein machine operation is interrupted and an error message is displayed on computer 32 directing the operator to check the fastener.

If the current operation is upsetting the fastener and the sensor signal increases, this may indicate lower anvil runaway or clamp binding. Lower anvil runaway means the lower anvil 26 moves upward beyond its intended set point, pushes on the bottom of workpiece W and lifts the workpiece. Clamp binding means that the lower clamp sleeve 30, which moves up during the cycle to create the clamp force to hold the workpiece panels together and is typically a pneumatically driven cylinder, experiences misalignment and binding such that the clamp sleeve does not yield during the cycle (i.e. it acts like a solid post instead of a pneumatic spring). A safety mode is triggered wherein machine operation is interrupted and an error message is displayed on computer 32 directing the operator to check for these problems.

Of course, the signal from the at least one sensor 50 may be used in ways other than those described above. For example, the sensor signal may be monitored as a redundancy check for the clamp system during normal cycles and during clamp calibration and coupon testing. The sensor signal may also be used to detect programming errors because incorrectly programmed operations (i.e., incorrect "recipes") can lead to force or deflection sensor measurements that are outside an expected range. The sensor signal may also be compared to a preset value and added or subtracted to workpiece thickness readings (i.e. "stack readings") to improving accuracy of a stack thickness measurement system.

As will be appreciated by those skilled in the art, the automatic riveting apparatus and method of operating an automatic riveting apparatus described above decrease cycle times by eliminating the need for conducting manual measurements. They also improve the quality of fastener installation, making it easier to achieve tight flushness tolerances, and may prevent costly damage to workpieces. Perhaps most importantly, the apparatus and method of the present invention improve safety.

What is claimed is:

1. An automatic fastening apparatus comprising:
a tool axis along which a tool is movable;
a pressure foot bushing having a clamping end for engaging a surface of a workpiece, a supported end opposite the clamping end, and a passage sized and arranged such that the tool is movable along the tool axis through the pressure foot bushing;
a pressure foot plate coupled to the supported end of the pressure foot bushing, wherein the pressure foot plate is actuated to cause the pressure foot bushing to exert a clamping force against the surface of the workpiece or the pressure foot plate is held at a predetermined location to cause the pressure foot bushing to oppose a clamping force exerted against another surface of the workpiece toward the clamping end of the pressure foot bushing, wherein the pressure foot bushing engages the pressure foot plate at a first region of the pressure foot plate;
at least one sensor connected to the pressure foot plate, the at least one sensor being arranged to measure a deflection of the pressure foot plate between the first region of the pressure foot plate and a second region of the pressure foot plate spaced from the first region or the at least one sensor being arranged between the pressure foot plate and the supported end of the pressure foot bushing, such that the at least one sensor generates a respective sensor signal measuring force transmitted between the pressure foot plate and the pressure foot bushing; and
a control system configured to command at least one of the following functions based at least in part on a value of the at least one sensor signal: (i) control motion of the tool, (ii) control the clamping force, (iii) control a position of the workpiece, (iv) control an angular orientation of the workpiece relative to the pressure foot bushing, and (v) trigger a safety mode.

2. The apparatus according to claim 1, wherein the at least one sensor includes a sensor that measures a deflection of the pressure foot plate and generates a signal proportional to the deflection, wherein the deflection is proportional to force transmitted between the pressure foot plate and the pressure foot bushing.

3. The apparatus according to claim 2, wherein the at least one sensor includes a strain gauge.

4. The apparatus according to claim 2, wherein the at least one sensor includes an encoder and a corresponding target.

5. The apparatus according to claim 2, wherein the at least one sensor includes a position transducer.

6. The apparatus according to claim 2, wherein the at least one sensor includes a probe.

7. The apparatus according to claim 1, wherein the at least one sensor includes a sensor that directly measures force between the pressure foot plate and the pressure foot bushing.

8. The apparatus according to claim 7, wherein the at least one sensor includes a load cell.

9. The apparatus according to claim 8, wherein the at least one sensor includes a plurality of sensors arranged in an angular array about the tool axis, wherein each of the plurality of sensors includes a load cell.

\* \* \* \* \*